Figure 1:
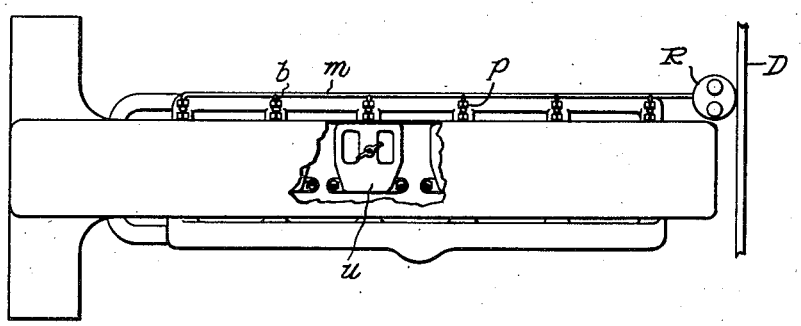

Jan. 11, 1938.  J. BIJUR  2,104,729
AUTOMATIC CENTRALIZED LUBRICATING INSTALLATION
Filed Dec. 29, 1928   3 Sheets-Sheet 1

INVENTOR
Joseph Bijur
BY
Dean, Fairbank, Obrieghts Hirsch.
his ATTORNEYS.

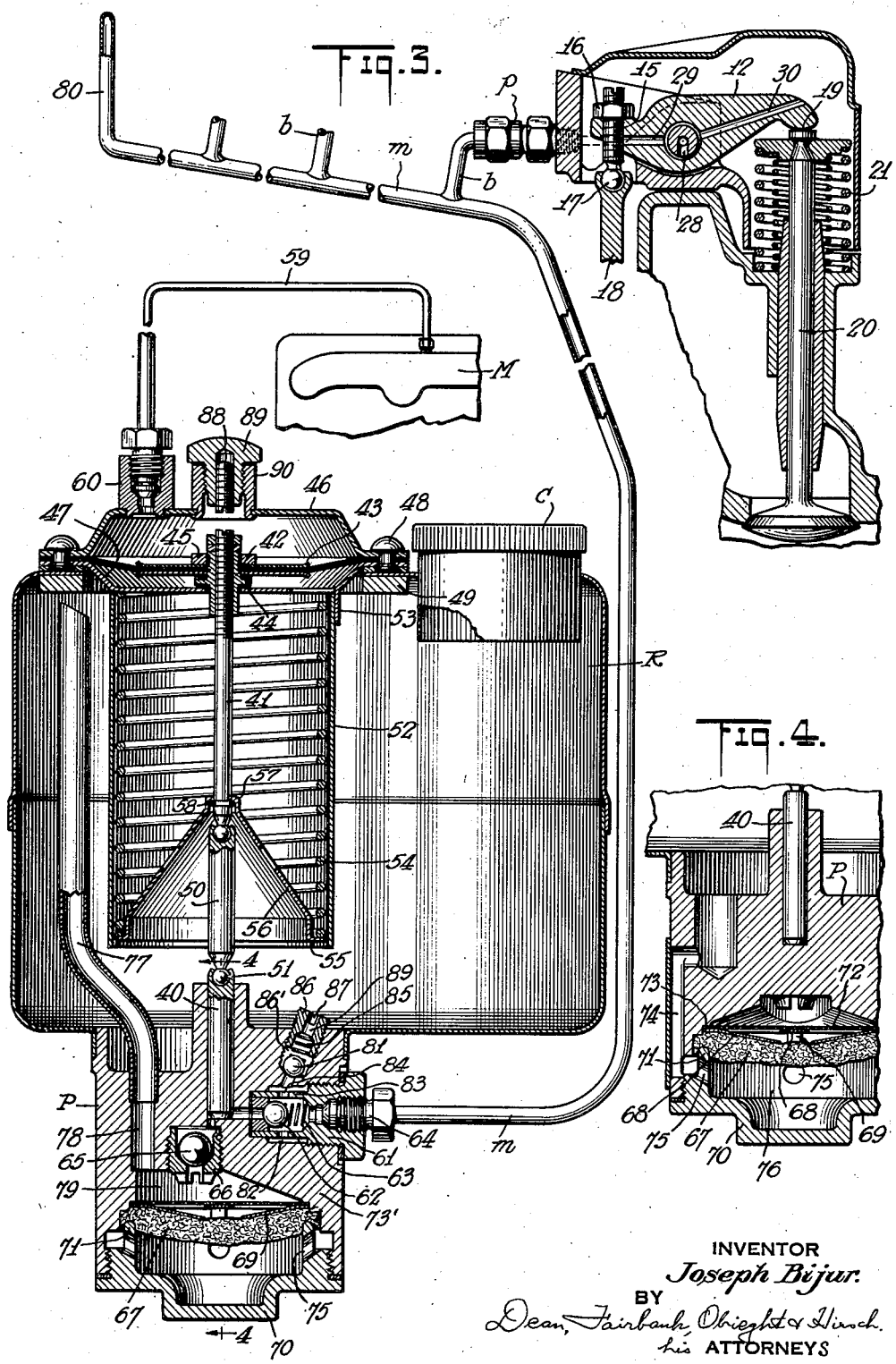

Jan. 11, 1938.　　　　J. BIJUR　　　　2,104,729
AUTOMATIC CENTRALIZED LUBRICATING INSTALLATION
Filed Dec. 29, 1928　　　3 Sheets-Sheet 3
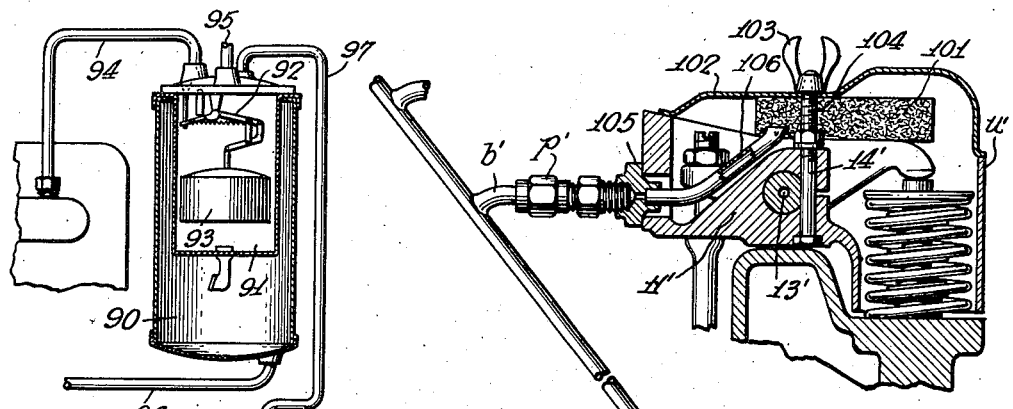
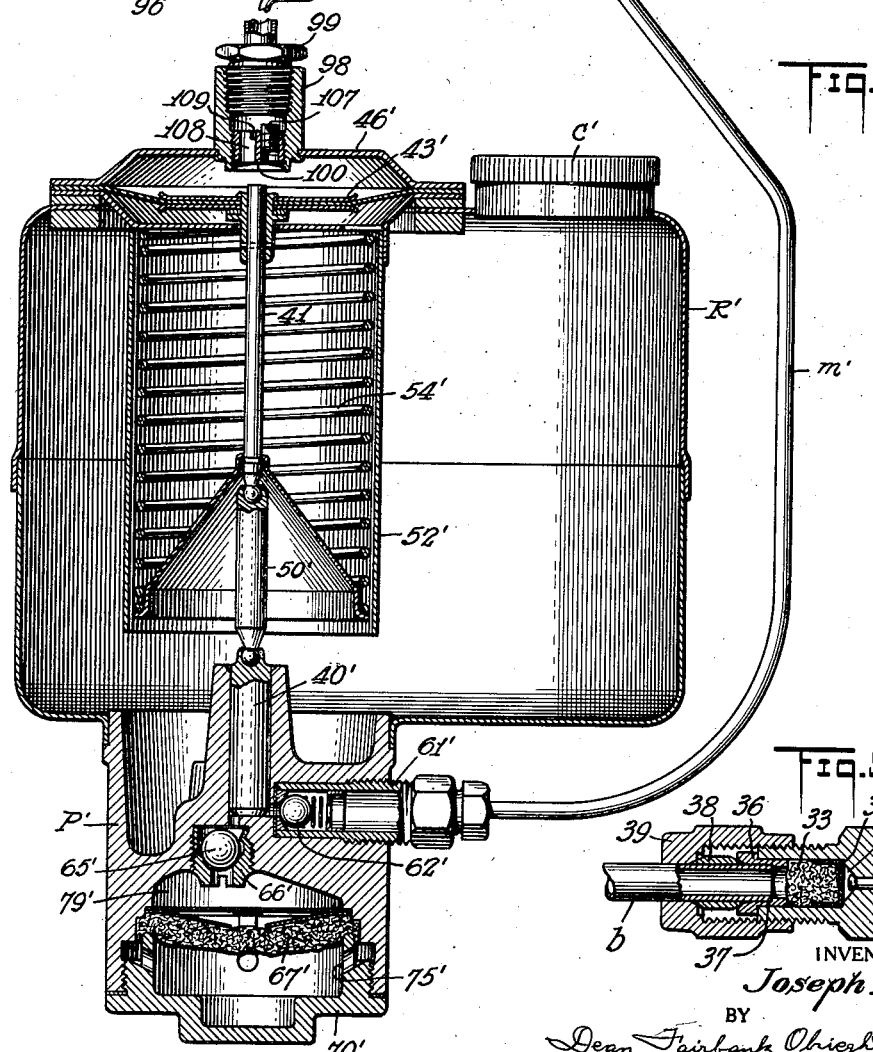
INVENTOR
Joseph Bijur
BY
Dean, Fairbank, Obright & Hirsch
his ATTORNEYS.

Patented Jan. 11, 1938

2,104,729

UNITED STATES PATENT OFFICE 2,104,729

AUTOMATIC CENTRALIZED LUBRICATING INSTALLATION

Joseph Bijur, New York, N. Y., assignor to Auto Research Corporation, a corporation of Delaware Application December 29, 1928, Serial No. 329,172

25 Claims. (Cl. 184—6)

My invention is of particular utility in the lubrication of bearings at nearly uniform level on an automobile or other mechanism or installation that is commonly operated intermittently or at varying speeds and under varying conditions.

It is an object of the invention correctly and automatically to meter the lubricant to the bearings at slow rate in accordance with the requirements thereof, and to dispense with the need for any care other than maintaining available a supply of lubricant, all by the use of simple mechanism, devoid of such complications as reduction gearing, yet without over-oiling under one extreme of the varying conditions of operation on the one hand, or under-oiling at the other extreme.

Another object is to accomplish such metered feed under low pressure, yet by positive propulsion, eliminating on the one hand the need for extreme restriction of the delivery outlets, and avoiding on the other hand an auxiliary cut-off for shutting off the operation of a lubricating system which depends on gravity as the low pressure propulsive agency.

Another object is, to meter the lubricant in the manner previously stated, from a pump actuated by a simple correlation with the operating mechanism, though such correlation cause a frequency or intensity of pump discharge wholly disproportionate to the lubricant requirements of the bearings.

Preferably the lubricant is supplied to the various bearings through restriction elements, desirably drip plugs supplied from corresponding branches of a common feed conduit and of invariant flow resistance, preferably springless or devoid of valves. Such drip plugs will emit at very low pressure and when at nearly uniform level will cease dripping when pressure application is discontinued.

The metered delivery is accomplished in one embodiment, without the need for controlling the frequency or rate of discharge from the pump or other source of pressure, by the use of a valve set at a predetermined low pressure and delivering back to the source of lubricant any discharge from the pump in excess of that required to sustain a given pressure upon the conduit system leading to the various bearings. Preferably pressure variations are reduced between pump discharges by resilient capacity on the conduit system.

In another embodiment, the control is effected by discharging a pump of definite volume to feed substantially its entire contents to the distributing system at controlled intervals depending on distance run, power consumption or other definite function of the running conditions of the mechanism. If desired, means may be provided to intercept the lubricant in advance of the bearings and to give it off to the bearings during the intervals between successive emissions.

While other types of pump may be employed, I have found it convenient in the application to motor vehicles, or internal combustion engines, to provide a reciprocating spring-discharged piston pump, the charge of which is effected pneumatically from the engine, preferably by suction from the intake manifold. In the volume controlling embodiment, the suction may be derived from the float chamber of the vacuum fuel feed system. In the pressure controlled system, the suction for actuating the diaphragm may be applied direct from the intake manifold.

The invention is exemplified in the lubrication of the rocker arms governing the operation of the valves of an internal combustion engine. In certain types of air cooled engines particularly, these rocker arms may become so hot as to carbonize the usual engine oil preferable for the crank shaft. As the operating temperature at such rocker arm bearings remains approximately constant summer and winter, propulsion under constant pressure is suitable,—as distinguished from the problem of lubricating chassis bearings, under the varying temperatures there occurring, in which case constant pressure propulsion would ordinarily cause enormous variations in the volumes fed to the bearings.

Figure 2:
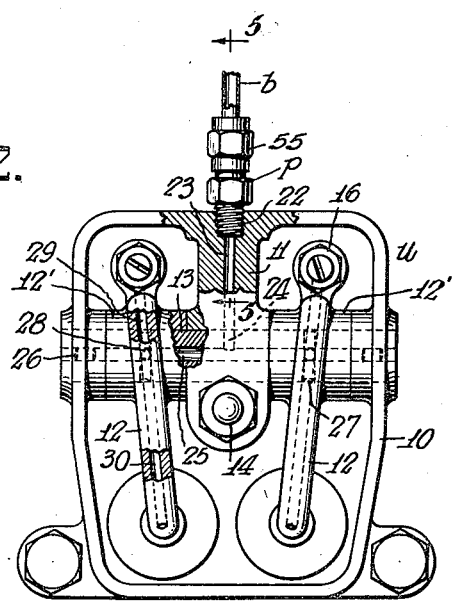

In the accompanying drawings in which are shown one or more of various possible embodiments of the several features of the invention, Fig. 1 is a diagrammatic plan view of a preferred installation, Fig. 2 is a plan view partly in section and on a larger scale indicating one embodiment of rocker arm unit, Fig. 3 is a fragmentary diagrammatic view of the installation showing the constituent elements in cross section, Fig. 4 is a fragmentary cross-section taken on line 4—4 of the pump shown in Fig. 3, Fig. 5 is a longitudinal cross-section on a larger scale of a preferred form of drip plug and taken on line 5—5 of Fig. 2, and, Fig. 6 is a view similar to Fig. 3 of another embodiment of lubricating installation.

Referring to Figs. 1 to 4 of the drawings, I have shown the plan view of an internal combustion engine having rocker arm units U one for each cylinder head.

Each rocker arm unit includes a bracket case 10 presenting a bracket clamp 11 at opposite sides of which are rocker arms 12, one for controlling the inlet valve and the other the outlet valve of the corresponding engine cylinder. The rocker arms of each unit are pivoted at hubs 12' thereof on a common pivot pin or support axis 13 which is securely gripped in the bracket clamp, by tightening lock bolt 14 to draw together the cleft jaws of the clamp about said pin.

A bolt 15 through one end of the rocker arm 12 is secured by nut 16 and has a ball and socket connection 17 with a rod 18, the lower end of which is actuated from the cam shaft (not shown) for reciprocating the rocker arm. The opposite end 19 of the rocker arm engages the upper extremity of the valve stem 20 which is kept raised for valve closure by coil spring 21.

To supply lubricant to the mounting bearings of the rocker arms and to the operating and valve bearing ends thereof, I preferably provide a lubricant inlet socket 22 at each bracket case, communicating through a corresponding bore 23 longitudinally of bracket clamp 11 and continuing radially of pin 13 as at 24 to the axis of the latter to feed into a longitudinal bore 25 through the length of the pivot pin 13, said latter bore being plugged at its ends as at 26. Preferably the pin 13 has peripheral grooves 27 within the hubs 12' of the respective rocker arms and has radial bores 28 leading from the axial bore 25 to said grooves, the grooves in turn feeding lubricant through bores 29 and 30 longitudinally of the rocker arms, the former feeding the universal joint 17, the latter the valve stem 20. The overflow of oil past the grooves 27 lubricates the respective rocker arm hub bearings 12' upon the pivot pin 13.

Preferably the various rocker arm bearings of the entire engine are supplied from a single central system. For this purpose, valveless drip plugs *p* preferably of the construction shown in Fig. 5 are threaded into the corresponding inlet socket 22 in the respective rocker arm casings 10. Each of the drip plugs is supplied from a corresponding branch *b* all of said branches tapped from a common feed pipe line *m* supplied from a reservoir R hereinafter to be described and which may be mounted by a suitable bracket (not shown) to the front of the dashboard D.

While the drip plug or other restriction may be of any of a variety of different constructions, I prefer that shown in Fig. 5. Since the details of the drip plug taken by itself are not material to the present invention, it need be but briefly noted that the same comprises a fitting 31 having an accurately gauged longitudinal bore into which fits a headed restriction pin 32 of diameter accurately fixed, thus determining the magnitude of restricted passage therethrough. The restriction pin is protected from solid particles by a strainer wad 33 backed with metal screen cap 34 and lodged in a corresponding socket 35 in the inlet end of the fitting. Preferably a hardened steel bushing 36 is lodged in the inlet end of the fitting and compresses the periphery of the felt 33. The feed pipe branch *b* is connected in lubricant-tight relation with respect to the drip plug by bottoming against a shoulder 37 in the steel bushing, which bushing also serves as a reaction piece for the compression coupling sleeve 38 encircling the feed pipe and is tightened by the application of threaded bushing 39 upon the drip plug fitting.

In Fig. 3 is shown the reservoir R having a pump casing P secured in the bottom thereof and extending therebelow. The pump includes a reciprocating plunger 40 operated by a connecting rod 41 the upper end of which is screwed into a flanged nut 42 extending centrally through a diaphragm 43 against which the shoulder 44 of said nut is clamped by a counter nut 45. The diaphragm 43 is housed in a capsule formed of a pair of cups 46, 47 riveted together at 48 near their peripheries, the assembly being secured by screws (not shown) to a backing ring 49 welded under the top of the reservoir. For ease of assembly and operation, the lower end of the connecting rod 41 is joined by means of a short link 50 to the plunger, said link having ball and socket connections 51 with said respective elements. A cartridge 52 is secured to downturned tongues 53 of the capsule cup 47 and houses a coil spring 54 reacting at its lower end against the outturned flange 55 of a conical piece 56 turned in at its reduced upper end 57 to rest upon a split ring 58 encircling the lower end of the connecting rod 41.

The pump is shown operated from the intake manifold M of the engine, a connecting pipe 59 communicating therefrom with the upper cup 46 of the capsule, to which said pipe is connected by means of a terminal fitting 60.

The pump discharges through an outlet fitting 61 extending laterally into the pump casing P and having a check or non-return valve 62 seated by spring 63. The fitting has applied thereto a threaded bushing 64 for affixing the supply pipe *m* which leads to the various rocker arm structures.

The pump has an inlet valve 65 which rests by gravity in a cage 66 below the piston 40, and in turn is threaded in place into the casing P.

Preferably as shown, the inlet and outlet respectively are closely adjacent the pump plunger and afford a minimum of empty space so that in the rise of the piston, a maximum proportional increase of volume and maximum suction occurs, sufficient to raise the valve 65 from its seat in order to draw a charge.

An open vent pipe 77 is fitted at its lower end into bore 78 in the casing P and communicates with the space 79 above filter 67, and extends upward within the reservoir to near the top thereof.

Preferably the pump is provided with a filter 67 assuring not only the supply of clean oil to the pipe line, but also protecting the pump valves 65 and 62 from derangement due to solid particles entrained with the oil.

The filter disk 67 has preferably a sheet metal ring 68 thereon with a plurality of downturned spring fingers 69, normally bowing the felt downward, to a degree exaggerated in the drawings. A removable hollow closure cap 70 threaded into the lower end of the pump casing, has an upstanding flange 71 compressing the rim of filter 67 and urging the latter, the rim of disk 68 and the rim of a superposed flat wire mesh disk 72 against shoulder 73 in the casing. The lubricant drains from the reservoir to the cavity below the filter disk through a passage 74 laterally of the disk, a plurality of ports 75 in the flange 71 of the cap 70 establishing communication to the space 76 under the felt disk. In the up-stroke of the pump, suction is applied at the felt 67 and to the contents of vent pipe 77. By reason of its inertia, the volume of oil in the vent pipe 77 is not apt to be advanced under a quickly applied suction stroke of the pump 40. The felt 67 however will flex upward against the resilience of spring fingers 69 which thereafter slowly push the felt downward while lubricant from therebelow seeps upward therethrough, affording a filtered supply for the next pump charge. In a slow up stroke of the pump, the oil may be drawn in part or in whole from the vent passage. While the use of disk 68 with its fingers 69 is preferred, it is not entirely indispensable.

Preferably the pipe line m is provided with resilient storage capacity tending to sustain the pressure thereon during the intervals between successive pump discharges. This resilient capacity may be conveniently afforded by providing an upstanding extension 80 closed at its outer extremity beyond the last of the branches b. The air naturally trapped in riser 80 is compressed in the charging stroke of the pump and sustains pressure by its expansion during the intervals between charging strokes.

Preferably a pressure controlling valve 81 is provided in the pump casing immediately above outlet fitting 61. Communication to valve 81 exists through an annular cavity 82 about the reduced inner end 83 of fitting 61 which is perforated at 84. Thus, in the descent of the pump plunger 40, the pressure is never allowed to rise above that of the spring 85 seating valve 81, while the air bell 80 sustains the pressure during the intervals between successive operations. Accordingly, though the upwardly flexed diaphragm 43 be released only at irregular intervals, in response to occasional opening movement of the engine throttle for acceleration, or to stopping of the engine, yet the pressure on the drip plugs is sustained during much or all of the period of engine operation. Preferably the spring 85 seating the pressure controlling valve is adjustable to determine the desired or required pressure. To facilitate adjustment the screw plug 86 against which spring 85 reacts is obliquely arranged in bore 86' as shown, and provided with a fillister slot 87 for convenient access of a screw driver inserted through the open filling cap C. The latter protrudes downward into the reservoir to below the upper end of the vent pipe 77 and thereby tends to preclude the entry of oil into pipe 77 that has not first passed through filter 67.

In addition to the pressure adjustment I preferably provide also a pump stroke adjustment. This comprises a stop pin 88 serving as an abutment for the upper extremity of rod 41. Pin 88 is longitudinally adjustable within the holder plug 89 threaded in socket 90 on cap 46.

The embodiment of Figs. 1 to 4 is especially suitable in the relation described, because under the constant pressure maintained on the system by the action of valve 81, no excess of lubricant will be supplied to the rocker arms even though the engine be frequently started and stopped and the pump of course operated with corresponding frequency. The excess lubricant beyond that required to sustain the pressure, escapes through the port 89 in plug 86 back into reservoir R. Nor will the cold have any effect on the volume of distribution under the definite pressure maintained by valve 81 inasmuch as the reservoir as well as the rocker arms are maintained, throughout operation, at the temperature under the hood which temperature is approximately the same summer and winter.

In practice the pressure sustained on the conduit system is in the order of one pound, a pressure ineffective were drip plugs with spring seated valves employed. The pressure is in the order of that obtainable by the use of a gravity tank at level, a foot or two above the drip plugs, but such an installation might be awkward in the present relation. In the present arrangement the reservoir and pump are at level lower than the drip plugs as shown, and accordingly no special shut off is required when the engine stops, drainage from the reservoir being precluded. The restricted drip plugs, especially with valve 62, maintain the conduit system at all times filled with lubricant. The drip plugs though springless or valveless, will not allow leak to occur during the intervals between engine operations, since these plugs are substantially at uniform level. Accordingly lubrication begins promptly upon starting the mechanism, without the need first to fill empty or partly empty conduits.

In the embodiment of Fig. 6 the general construction of the pump and reservoir is similar to that of Fig. 3 and therefore only the features of difference need be described. Similar reference characters primed identify corresponding parts. A vent pipe similar to pipe 77 of Fig. 3 is employed but this is not shown. In this embodiment the intervals between successive discharges of the predetermined volume of the pump are more or less measured and determined by control from the vacuum fuel feed system which trips at intervals corresponding approximately to definite mileage runs. Accordingly, no means is required for determining the pressure on the distributing pipe m' nor is any special means provided for sustaining the pressure during the intervals between pump operations although such means may be employed if desired.

In the drawings is shown a diagrammatic view of a familiar construction of vacuum fuel feed including the main tank 90, a float chamber 91, and the toggle-operated valve construction 92 controlled by the float 93 and connected by pipe 94, to the intake manifold, and vented at 95, a pipe 96 draining to the carbureter (not shown).

Pipe 97 leads from the top of the float chamber to the upper cap 46' of the diaphragm capsule which is provided with a nipple 98 for connection of the pipe end by means of a coupling screw 99. By this arrangement, as long as suction from the intake manifold is applied to the float chamber 91 it is also applied to the diaphragm, the latter being maintained flexed upward and the spring 54' accordingly stressed, the upper end of rod 41 limiting flexure by its engagement with stop 100. When the valve device 92 of the float chamber is thrown by rise of the float 93, vent 95 is opened and the space above diaphragm 43' is then also vented. The stressed spring 54' then expands and causes the pump plunger 40' to eject its charge into the pipe system m' for distribution through the drip plugs p'. Thus the pump at intervals, ejects its charge, simultaneously with the tripping action in the vacuum fuel feed float chamber and this occurs in practice once approximately every two fifths of a mile.

In the present embodiment the rocker arms are shown with a lubricant intercepting construction in itself more or less conventional. Each rocker arm unit includes an individual felt 101 superposed over the rocker arm assembly thereof, and held in place by the closure cap 102 which is held in place by a wing nut 103 threaded upon an extension 104 of the clamping bolt 14' by which the pivot pin 13' is clamped in place. In the present embodiment each drip plug p' is affixed in an adapter 105 into which is fitted the end of a pipe 106 extending within the case U' generally along the bracket clamp 11' to feed upward through the outlet end into the corresponding felt 101. Thus the felt will intercept the lubricant fed by the pump and allow it to seep to the bearings of the rocker shaft. It is understood that the felts may be omitted if desired or that other equivalent storage means may be employed.

Illustratively the diameter of pump plunger 40' is shown larger than that of the embodiment of Fig. 3, inasmuch as the pump operations are less frequent than in the other embodiment. The pump stroke is however adjustable for regulation of the feed in accordance with the particular demands of the engine. While the specific stop of Fig. 3 would be suitable I have shown an alternative construction. In the present case the stop 100 is carried by the inlet nipple 98 instead of in a separate nipple as in Fig. 3. For this purpose a screw plug 100 is threaded into the lower end of the nipple 98, said plug having a clamp screw 107 in a laterally disposed bore through the thickness thereof, the tightening of which causes expansion of the screw plug to affix it in any position of adjustment in the sleeve, such adjustment being effected by a screw driver applied to fillister slot 109. The screw plug 100 has another longitudinal bore 108 therein through which the suction is applied to the diaphragm.

While it is preferred to use the rocker arm lubricating arrangement of each of Figs. 3 and 6 with the pump shown in the same figures, these elements may be interchangeably used.

While the invention is shown in a specific application for lubricating engine rocker arms, the invention has a wider range of application, especially in those relations where the various outlets leading to the bearings are at approximately uniform level and not subject to change of temperature of such magnitude as to cause wide variations in the viscosity of the oil.

It is preferable to provide a suitable gauge or other indicating means to apprise the user of the need for refilling the reservoir when nearly empty.

The present application is a continuation in part of application Serial No. 580,668 filed August 9, 1922 and application Serial No. 282,956 filed June 5, 1928, which latter application has matured into Patent No. 1,732,212.

I claim:—

1. A central lubricating system for a mechanism including a plurality of bearings at substantially uniform level, said system including a source of lubricant, a pump associated therewith and at level lower than said bearings, a distributing conduit connected to the outlet of said pump and having a plurality of branches leading to said bearings, a springless drip plug in each of said branches, means for operating said pump, said operating means responding to a condition of operation of the mechanism of effectiveness disproportionate to the lubricant requirements of the bearings, and a spring-seated valve near the inlet of said conduit system draining back to said source, the excess of said pump discharge beyond the requirements of said system.

2. A centralized system for lubricating a plurality of bearings at substantially uniform level upon a motor vehicle, said system including a source of lubricant supply, a pump connected to the intake manifold of the engine for operation in response to substantial changes in suction thereat, a conduit system supplied from said pump and having branches leading to a plurality of bearings, each of said branches having a springless drip plug therein, and a spring-seated valve near the inlet of said pipe system discharging excess delivery from said pump.

3. Means for distributing lubricant to a plurality of bearings, said means comprising a distributing conduit having outlet branches with flow restriction fittings applied at the respective bearings for feeding lubricant thereto, said pipe having an elevated closed extension to determine a pressure equalizing air bell, and means for intermittently forcing lubricant into said conduit, said extension being formed by extending said pipe beyond said outlet branches and closing the end of said pipe, whereby an elongated air pocket is formed having the same diameter as said pipe.

4. Means for lubricating the bearings associated with the rocker arms of an internal combustion engine, said means comprising a source of lubricant, a pump supplied therefrom, a conduit delivering the discharge of said pump, said conduit having a plurality of outlet branches leading to the respective rocker arm elements, each branch having a drip plug restriction therein, pump operating means comprising a diaphragm and means for intermittently applying suction to said diaphragm from the engine.

5. In an internal combustion engine of the type comprising an intake manifold and a group of rocker arm units; the combination of a lubricant pump, a conduit system supplied therefrom, having outlets leading to the various rocker arm units, each outlet having a drip plug flow controlling element, a diaphragm for operating said pump and having an operative connection with said intake manifold and adapted to be drawn thereby in pump-charging direction, and means tending to equalize the fluctuations in pressure on the conduit due to intermittent pressure applications at the pump.

6. In an internal combustion engine of the type comprising an intake manifold and a group of rocker arm units; the combination of a lubricant pump having a discharge spring, a conduit system supplied from said pump and having outlets leading to the various rocker arm units, each outlet having a drip plug flow controlling element, a diaphragm for operating said pump having an operative connection with said intake manifold and adapted to be drawn thereby in pump charging direction, and a pressure bell in the conduit system, resiliently to sustain pressure on the system during the intervals between pump discharges.

7. In an internal combustion engine of the type comprising an intake manifold and a group of rocker arm units; the combination of a lubricant pump having a discharge spring, a conduit system supplied therefrom and having outlets leading to the various rocker arm units, each outlet having a drip plug flow controlling element, a diaphragm for operating said pump, said diaphragm having an operative connection with said intake manifold, and adapted to be drawn thereby in pump charging direction, and a pressure controlling valve adjacent the pump adapted to feed into the reservoir and manually adjustable to determine the pressure on the system.

8. In an internal combustion engine of the type comprising an intake manifold and a group of rocker arm units; the combination of a lubricant pump having a discharge spring, a conduit system supplied therefrom and having outlets leading to the various rocker arm units, each outlet having a drip plug flow controlling element, a diaphragm for operating said pump, said diaphragm having an operative connection with said intake manifold and adapted to be drawn thereby in pump charging direction, and a pressure bell in the said conduit sustaining the pressure during the intervals between successive pump operations.

9. A central lubricating installation for a mechanism having a plurality of spaced bearings maintained at relatively constant temperatures, comprising a branched conduit system with a single inlet and a plurality of outlets leading to the bearings to be lubricated, high resistance flow proportioning drip plug devices positioned at the connection of said outlets to said bearings for proportioning among said bearings relatively minute quantities of lubricant at a predetermined pressure range, a central lubricant supply and pressure source associated with the inlet of said distributing system actuated by said mechanism and discharging quantities of lubricant in excess of the minute quantities to be proportionately distributed by said drip plug devices and creating pressure in excess of said predetermined pressure range and means associated with said distributing system for relieving said excessive lubricant supply and pressure.

10. In combination with a plurality of suction-producing devices having a series of cylinders, a series of pistons in said cylinders, a suction chamber, passages between said suction chamber and said cylinders and valve mechanisms for opening and closing said passages to permit suction to be created in said suction chamber by said pistons; a central lubricating installation for said mechanisms comprising a distributing piping system with a single inlet and a plurality of branching outlets each of which lead to one of said mechanisms, flow proportioning devices positioned at the connection of said branching outlets to said mechanisms, a lubricant supply and pressure source connected to said inlet, and means for actuating said supply and pressure source from said suction chamber.

11. A central lubricating installation for a mechanism having a plurality of spaced bearings, comprising a branched conduit system with a single inlet and a plurality of outlets leading to the bearings to be lubricated, a central lubricant supply and pressure source associated with the inlet of said distributing system for supplying lubricant to said system, flow proportioning drip plug devices positioned at the connection of said outlets to said bearings for proportioning among said bearings relatively minute quantities of lubricant, said drip plug devices restricting the flow of lubricant through said outlets, thereby causing slow emission to the bearings, and affording a high resistance to the flow of lubricant which remains constant substantially regardless of the pressure created by said source, and an additional restricted pressure-responsive outlet from said system varying in its resistance with variation in pressure.

12. A central lubricating installation for a plurality of spaced bearings of a mechanism comprising a branched distributing piping system with a single inlet and a plurality of outlets leading to the bearings, flow proportioning devices positioned at said outlets, a resiliently discharged pump associated with said inlet, means associated with said system affording resilient resistance to the discharge of said pump and including a spring seated valve and an air chamber and a resilient release also associated with said system.

13. A central lubricating installation for the bearings of an automotive vehicle of the type comprising an engine, a fuel reservoir and a mechanism for supplying fuel from said reservoir to said engine, said installation comprising a distributing piping system with a single inlet and a plurality of outlets leading to said bearings, flow proportioning devices positioned at the connection of said outlets to said bearings, a lubricant supply and pressure source associated with the inlet of said system and means for actuating said lubricant supply and pressure source in turn actuated by the fuel supply mechanism.

14. A central lubricating system for a vehicle of the type having a vacuum-operated fuel feed system including a float chamber, said lubricating system including a lubricant reservoir, a piston pump therein, a distributing conduit system supplied from said pump, suction means for lifting said pump plunger, said means connected to the float chamber and a spring for discharging said plunger, whereby the pump will automatically discharge at intervals corresponding approximately to fuel consumption or distance run.

15. A central lubricating system for a mechanism including a plurality of bearings at substantially uniform level, said system including a source of lubricant, a pump associated therewith and at level lower than said bearings, a distributing conduit connected to the outlet of said pump and having a plurality of branches leading to said bearings, a springless drip plug in each of said branches, means for operating said pump, said operating means responding to a condition of operation of the mechanism of effectiveness disproportionate to the lubricant requirements of the bearings, and a spring-seated valve near the inlet of said conduit system, draining back to said source, the excess of said pump discharge beyond the requirements of said system, the conduit having resilient storage capacity to sustain pressure thereon during the intervals between pump operations.

16. An engine having a plurality of rocker arm structures, each substantially comprising a casing having lateral walls and a median bracket wall, rocker arms at opposite sides of said bracket wall, a support axis for said arms, and supported in said lateral and bracket walls, and means for supplying lubricant to said rocker arms, said means comprising a lubricant inlet substantially at said bracket wall, a passage through said bracket wall communicating with a longitudinal bore through said axis plugged at its opposite ends, and bores through the respective rocker arms communicating with the bore through the axis, each of said structures having a flow restriction fitting fixed therein at said inlet and a common source of supply feeding lubricant under pressure simultaneously to all said restriction fittings.

17. A central lubricating installation for a mechanism having a plurality of spaced bearings maintained at relatively constant temperatures, comprising a branched conduit system with a single inlet and a plurality of outlets leading to the bearings to be lubricated, high resistance flow proportioning drip plug devices positioned at the connection of said outlets to said bearings for proportioning among said bearings relatively minute quantities of lubricant at a predetermined pressure range, a central lubricant supply and pressure source associated with the inlet of said distributing system actuated by said mechanism and discharging quantities of lubricant in excess of the minute quantities to be proportionately distributed by said drip plug devices and creating pressure in excess of said predetermined pressure range, means associated with said distributing system for relieving said excessive lubricant supply and pressure, and means for maintaining the distributing system substantially completely filled with lubricant during the intervals between pressure applications, said relieving means including a spring seated check valve actuated when relieving said excessive lubricant supply and pressure to permit lubricant flow from said inlet to said source, and said maintaining means including a spring seated valve at said inlet cooperating with said high resistance drip plug device to prevent flow except when said source is feeding lubricant under pressure into said system.

18. A central lubricating installation for a mechanism having a plurality of spaced bearings maintained at relatively constant temperatures, comprising a branched conduit system with a single inlet and a plurality of outlets leading to the bearings to be lubricated, flow proportioning drip plug devices positioned at the connection of said outlets to said bearings for proportioning among said bearings relatively minute quantities of lubricant at a predetermined pressure range, a central lubricant supply and pressure source associated with the inlet of said distributing system actuated by said mechanism and discharging quantities of lubricant in excess of the minute quantities to be proportionately distributed by said drip plug devices and creating pressure in excess of said predetermined pressure range and means associated with said distributing system for relieving said excessive lubricant supply and pressure, said drip plug devices being of the type to feed the minute lubricant requirements of the bearings thereto at low pressures within and below said range.

19. A central lubricating installation for a mechanism including an internal combustion engine of the type enclosed in a hood and having a group of rocker arm units having bearings, the parts within the hood being maintained at relatively uniform temperature regardless of varying climatic conditions, said installation comprising a branched conduit system with a single inlet and a plurality of outlets leading to the bearings to be lubricated, high resistance flow proportioning drip plug devices positioned at the connection of said outlets to said bearings for proportioning among said bearings relatively minute quantities of lubricant at a predetermined pressure range, a central lubricant supply and pressure source associated with the inlet of said distributing system actuated by said mechanism and discharging quantities of lubricant in excess of the minute quantities to be proportionately distributed by said drip plug devices and creating pressure in excess of said predetermined pressure range, and means associated with said distributing system for relieving said excessive lubricant supply and pressure, said drip plug devices feeding the bearings of said rocker arm units.

20. A central lubricating installation for a mechanism having a plurality of spaced bearings, comprising a branched distributing system with a single inlet and a plurality of outlets leading to said bearings, a lubricant supply and pressure source connected with the inlet of said system for supplying lubricant thereto, flow proportioning devices positioned at the connection of said outlets to said bearings and a resilient chamber associated with said system substantially removed from said branches, said bearings and said supply and pressure source, the resilient chamber being positioned upon the main line of the system substantially beyond the outlet branches of said system leading to the bearings.

21. A central lubricating installation for the bearings of an automotive vehicle of the type comprising an engine, a fuel reservoir and a mechanism for supplying fuel from said reservoir to said engine, said installation comprising a distributing piping system with a single inlet and a plurality of outlets leading to said bearings, flow proportioning devices positioned at the connection of said outlets to said bearings, a lubricant supply and pressure source associated with the inlet of said system and means for actuating said lubricant supply and pressure source in turn actuated by the fuel supply mechanism, the actuating means for the lubricant supply and pressure source being of such construction as to supply a quantity of lubricant proportional to the quantity of fuel supplied to the engine.

22. An engine rocker arm construction of the type comprising a casing having lateral walls and a median bracket wall, rocker arms at opposite sides of said bracket wall, a support axis rod for said arms, and supported in said lateral and bracket walls, means for supplying lubricant to said rocker arms, said means comprising a lubricant drip plug inlet substantially at said bracket wall and threaded thereinto, a passage through said bracket wall communicating with a longitudinal bore through said axis rod plugged at its opposite ends, and bores through the respective rocker arms communicating with the bore through the axis rod plugged at its opposite ends, said last mentioned communication being established by vertical bores through the lower half of said axis rod and peripheral grooves around said rod where it is embraced by said rocker arms.

23. A central lubricating installation for a mechanism having a plurality of spaced bearings, comprising a branched conduit system with a single inlet and a plurality of outlets leading to the bearings to be lubricated, high resistance flow proportioning drip plug devices positioned at the connection of said outlets to said bearings for proportioning among said bearings relatively minute quantities of lubricant at a predetermined pressure range, a central lubricant supply and pressure source associated with the inlet of said distributing system actuated by said mechanism, creating pressure outside of said predetermined pressure range and means associated with said system for preventing pressure below said predetermined range from being transmitted to the drip plug devices and relieving pressures above said predetermined range.

24. A central lubricating installation for a mechanism having a plurality of spaced bearings comprising a branched distributing system with a single inlet and a plurality of outlets leading to said bearings, a lubricant supply and pressure source connected with the inlet of said system for supplying lubricant thereto, flow proportioning devices positioned at the connection of said outlets to said bearings and a single resilient chamber associated with said system substantially removed from and on the other side of said branches and said bearings from said supply and pressure source.

25. A central lubricating installation for a mechanism having a plurality of spaced bearings, comprising a central reservoir, a central pump supplied from said reservoir, a branched conduit system with a single inlet, and a plurality of outlets leading to the bearings to be lubricated from said system, high resistance flow proportioning drip plug devices positioned at the connection of said outlets to said bearings adapted to proportion among said bearings relatively minute quantities of lubricant at a predetermined pressure range, said central reservoir and pump feeding the inlet of said distributing system and said pump being actuated by said mechanism, and creating pressure outside of said predetermined pressure range, and means associated with said distributing system for relieving pressures above said predetermined range and for preventing transmission of pressures outside of the predetermined pressure range to the drip plug devices, said means including cooperating adjacent spring seated valves one closing the inlet of the system from the pump when the minimum pressure is not exceeded and the other opening the inlet to the system to the reservoir when the maximum pressure has been exceeded.

JOSEPH BIJUR.